United States Patent Office 3,184,314
Patented May 18, 1965

3,184,314
METHOD FOR THE PRESERVATION OF SILAGE
Joseph G. Forest, Waverly, and Edward J. Czarnetzky, Chazy, N.Y., assignors to International Stock Food Corporation, Waverly, N.Y., a corporation of New York
No Drawing. Filed Apr. 20, 1962, Ser. No. 188,979
13 Claims. (Cl. 99—8)

This application is a continuation-in-part of our co-pending application Serial No. 81,930, filed January 11, 1961, now abandoned.

This invention relates to a method for preserving silage and more particularly to a method for inhibiting the loss of nutrients in silage.

A principal problem which confronts farmers and ranchers in many of the leading stock farming districts of the country is the adequate storage of the different forages and grains with a minimum loss due to spoilage so that most of the nutrient values of the silage are maintained and are later available to the animals. Since fermentation usually occurs in silage, the resultant heat stimulates the activity of many microorganisms including some bacteria which coincidental to the heat destroy many of the useful ingredients of the silage, such as vitamins, enzymes, proteins, etc., which in turn detracts from the palatability and nutrient value of the silage to the animals.

During fermentation, silage such as corn has its sugars changed to organic acids, such as lactic and acetic acids, in amounts which would assist the preservation of the silage except that the increase of harmful bacteria, which are not checked by the acidity present in the silage or by the lack of oxygen, results in their destroying the acids and thus causes a rotting of the silage.

The principal loss of nutrients in the silage is caused by the oxidation taking place during the normal fermentation wherein a part of the nutrient, principally the sugars, is oxidized to carbon dioxide and water, and thus is lost. As stated above, loss of the nutrient makes the silage unpalatable to the animal. Furthermore, there is a considerable loss of silage due to spoilage at the top and sides of the silo wherein the forage is stored, since the production of acid and the stimulation of beneficial bacteria are hindered in these areas.

Another problem encountered by farmers and feed mill operators concerns the waste and subsequent loss of corn grist due to spoilage. When a new corn crop is harvested, the corn cob and its kernels have a high moisture content, i.e., between 25% to 35%. When the farmer sends his corn to the feed mill to be ground, a certain amount of heat is generated after the corn meal or grist is bagged. After a few days in the bags the grist may start to mold and eventually goes to waste.

The same problem exists when the corn is stored during the winter, since the water therein freezes and remains in the corn until such time that it is sent to the mill for grinding. There, the corn thaws and the ground corn containing moisture is bagged. The fermenting that occurs and the resulting heat evolved causes the corn grist to go to waste.

This problem of storing cereals, grains, grasses and the like which ordinarily have a high moisture content and thus are susceptible to fermentation and production of heat, which in turn causes molding and rotting of the stored materials, is quite serious and the annual financial loss to the farmers and others is high.

According, it is an object of this invention to obviate the aforementioned problems present in the storage of silage.

Another object of this invention is to provide a process for preventing fluid losses and preserving the yield of nutrients in silage.

A further object of this invention is to provide a process for preserving silage by reducing fermentation in the silage and maintaining an anaerobic atmosphere therein whereby the respiration of the grasses is stopped soon after they are ensiled, and thus the green color, carotene, fresh grass odor and flavor of the original forage are retained.

Still another object of this invention is to provide a process for preserving ground corn to prevent its molding and going to waste after it is bagged.

In attaining the objects of this invention, one feature resides in uniformly distributing throughout the silage an effective amount of sodium sulfate.

Another feature resides in admixing with the sodium sulfate a minor amount of malt diastase, particularly when corn is the product being ensiled.

Other objects, features and advantages of the invention will be obvious from the following discussion.

It has been found that loss of nutrients in silage may be prevented by uniformly distributing throughout the silage a predetermined amount of sodium sulfate or, when the silage is corn, a mixture of sodium sulfate and a minor amount of malt diastase. The sodium sulfate, or the mixture of sodium sulfate and malt diastase, may be added to the silage in any manner which will ensure its fair distribution through the entire ensilage mass.

The calculated amount may be added to each truck-load by even distribution over the top of the load as it is placed in position for unloading at the blower. The process of unloading and subsequent churning action taking place in the blower will ensure adequate mixing. In another method, the calculated amount of preservative is added on the top of each load of ensilage after it has been blown into the silo.

It has been found that when sodium sulfate is uniformly distributed throughout grass silage in the amount of from ½ pound to two pounds per ton of silage, and preferably in an amount of 1½ pounds per ton, spoilage which is commonly found in silage due to the factors described above is substantially decreased and the silage remains palatable to the animals since there is very little loss of nutrients.

For reasons of preservation ability and for the reasons concerning imbalance of mineral intake by cattle, the range of sodium sulfate should be from a maximum of two pounds per ton to a minimum of ½ pound per ton. Less than the minimum amount would have no appreciable effect on the preservative action.

When preserving corn silage, the sodium sulfate, which again is present in an amount of from ½ to 2 pounds per ton, has admixed therewith 1 part of malt diastase per 50 parts of sodium sulfate. However, the amount of malt diastase may be increased up to 5 parts per 50 parts of sodium sulfate with no untoward effects, but with no added advantage over the 1–50 ratio. Thus, the malt diastase may be present in an amount of from 2–10%, based upon the weight of sodium sulfate.

The aforesaid mixture of sodium sulfate and 2% by weight of malt diastase was admixed with corn grist produced by the grinding of corn cobs and the kernels in a feed mill. Good results were obtained when the mixture was present and thoroughly dispersed throughout the grist in an amount of about 1½ pounds per ton of corn grist. There was no evidence of molding of the grist after it had been bagged for a period of time.

The aforesaid mixture of sodium sulfate and malt diastase has also been incorporated in silage and has been added to grasses and fodders, such as hay, prior to baling. When one to two pounds of the mixture are dispersed throughout hay having a high moisture content, no abnormal heating or molding of the hay occurred. Thus, fermentation of the hay was inhibited and the nutrients in the hay were preserved.

The sodium sulfate appears to exert a stimulating action on the desirable organic acid-forming bacteria in the silage, and exerts a retarding action on the undesirable spoilage bacteria, while also slowing the growth of various mold species.

Malt diastase has the faculty of converting starch to sugar, which is an important nutrient for bacteria which produce acids which in turn preserve ensilage. Sodium sulfate also enhances the activity of those enzymes which break down starches into sugars, thus permitting the formation of additional acids.

The presence of the small amount of sodium sulfate uniformly distributed throughout the silage, or presence of the mixture of sodium sulfate and malt diastase, contributes to the production of anaerobic conditions and results in stopping the respiration of the grasses soon after they are ensiled. Heating of the ensiled forage is virtually eliminated, and more green color, carotene, fresh grass odor and flavor of the original forage are retained.

EXAMPLE I

Tests using sodium sulfate and sodium sulfate plus malt diastase on grass and corn ensilage were conducted in six silos, and the results are set forth in Table 1. The sodium sulfate was present in the amount of 1½ pounds per ton of grass, and was present in the same amount with the corn together with 2% malt diastase by weight of the sodium sulfate.

*Table 1*

TESTS USING SODIUM SULFATE AND SODIUM SULFATE PLUS MALT DIASTASE ON GRASS AND CORN ENSILAGE

|  | No preservative— Blue grass | Sodium sulfate— Blue grass | No preservative— Chopped corn | Sodium sulfate and malt diastase— Chopped corn |
|---|---|---|---|---|
| Protein | 6% | 6.4% | 4.5% | 4.8%. |
| Percent shrink | 16% | 20% | 11% | 12%. |
| Fluid loss | 4% | 0% | 5.5% | 1%. |
| Odor | Fair (faint manure) | Good | Fair | Strong acid. |

No ammoniacal or sulphidal odors were detected in any of the silos. The 20% shrink in the sodium sulfate-blue grass silo is compensated for by the fact that there was no fluid loss; thus the shrink was actually only a volume shrink and indicated compaction.

Uniform distribution of the preservative throughout the ensilage in a short time is assured, since sodium sulfate, being the salt of a strong base and a strong acid is fully ionized. In the presence of water it will distribute itself evenly in any continuous system without any stirring or shaking. Besides this method of producing homogeneity, there is the aid of the convection currents set up by temperature and concentration differences. The malt diastase being in solution, is distributed throughout the mass in an even manner by the aid of these convection currents. Immediately after malt diastase is placed in solution in the water of the ensilage, it acts upon the starches present in the corn and converts them to soluble sugars, which distribute themselves by means of concentration differences.

Thus, the chemical and physical properties of sodium sulfate and malt diastase are such that they distribute themselves in ensilage in a short time if scattered in a haphazard manner throughout the mass.

EXAMPLE II

A mixture of sodium sulfate and 2% malt diastase by weight of the sodium sulfate was sprinkled in the windrows of hay prior to baling so that an even distribution of the mixture in the amount of one pound per each ton of hay was achieved. The hay contained a moisture content which averaged approximately 24% to 35%. The temperature was taken in the center of the different bales of hay each day, and for the first three days the temperature varied from 88° to 96° F. The outside temperature on these days was 90° F. After an additional three days the temperature was taken again and the temperature of the bales was down to normal, namely from 84° to 88° F. in the center of the bales. Bales of hay having no preservative mixture added thereto had a temperature reading in the center of the bales of approximately 130° F. In subsequently examining the treated hay, it did not have any mold formation and no heat was generated therein and the hay maintained its color and odor.

EXAMPLE III

The mixture of sodium sulfate with 2% malt diastase by weight of sodium sulfate was also added in an amount of one to two pounds for each ton of corn grist, and the grist was then bagged. Upon subsequent examination of the bagged grist, it was noted that there was no increase in heat and no molding, whereas in corn grist which did not contain the mixture of the invention, heat was produced by fermentation and there was molding of the grist.

While it is preferred to add the mixture of the invention to the ground corn grist, the same results are obtained by dispersing the mixture with the corn in the crib during and prior to being ground. The aforesaid mixture of sodium sulfate and 2% by weight malt diastase was added to barley and admixed therein in an amount of one and one-half pounds of mixture per ton of barley, and the barley was then stored in bins. No trace of mold occurred.

The sodium sulfate, per se, or admixed with the malt diastase, has the ability to control fermentation in silage and cereals, such as corn, barley, hay, oats, corn grist, and the like, thus controlling the formation of heat in these high moisture-containing materials, and correspondingly controlling and inhibiting the formation of mold and loss of nutrients.

EXAMPLE IV

Tests were conducted with peavine silage with varying amounts of a mixture of sodium sulfate and 2% by weight thereof of malt diastase. An analysis of the silage after 20 days was then made and the results are set forth in Table 2.

*Table 2*

| Amount preservative per ton silage | pH | Percent protein | Vitamin A | Odor | Color | Texture |
|---|---|---|---|---|---|---|
| A. None | 7.4 | 2.7 | 0 | Putrid | Brown | Slippery. |
| B. ½ lb | 7.3 | 3.0 | 0 | ...do | ...do | Do. |
| C. 1 lb | 7.2 | 4.2 | + | Sl. sour | ...do | Normal. |
| D. 2 lbs | 6.4 | 4.7 | +++ | Pealike | Green | Do. |

Since fresh peavine silage is 4.7% protein, Test D shows that with 2 pounds per ton of silage, there is full retention of the protein and vitamin A content, while the untreated silage lost almost one-half of its protein and all of its vitamin A. Thus the presence of the minor amount of the preservative of the invention has doubled the feeding value of the peavine silage.

When tests were conducted with green oats silage, it was found that the silage which had been treated with 1½ pounds of sodium sulfate containing 2% by weight thereof of malt diastase, retained 82% of its carbohydrates and almost all of its vitamin A content. The untreated green oats silage had lost one-half of its carbohydrates and most of its valuable vitamin A content.

EXAMPLE V

A comparison was made between fresh grass silage, untreated silage after storage for a period of time, and grass silage which had been treated with one and one-half pounds of sodium sulfate and 2% by weight thereof of malt diastase and stored for the same period of time. The results are set forth in Table 3.

Table 3

|  | Fresh grass | Untreated | Treated |
| --- | --- | --- | --- |
| 1. Soluble sugars | 0.25 | 0 | 0.25. |
| 2. Total carbohydrates, starches and sugars. | 0.8 | 0.2 | 0.75. |
| 3. Lactic and acetic acids | 0 | 0.8 | 0.25. |
| 4. Propionic acid | 0 | Trace | 0.18. |
| 5. Vitamin A | +++ | do | ++. |
| 6. Appearance | Fresh | Digested | Fresh. |
| 7. Color | Green | Green brown | Green. |
| 8. Odor | Grassy | Putrid | Grassy. |

EXAMPLE VI

A test was conducted to show the heat damping and mold control effect of a mixture of sodium sulfate and 2% by weight thereof of malt diastase on corn and cob meal, which may be considered to be a high moisture cereal. The corn and cob meal had a 31% moisture content and was stored at a temperature of 60°–65° F. and the external temperature was kept within this range. The treated meal contained two pounds per ton of the aforesaid preservative. The results are set forth in Table 4.

Table 4

| Time of storage | Temperature, ° F., untreated meal | Temperature, ° F., treated meal |
| --- | --- | --- |
| 1st day | 59 | 54 |
| 2nd day | 92 | 66 |
| 3rd day | 114 | 87 |
| 4th day | 144 | 112 |
| 5th day | 120 | 120 |
| 6th day | 110 | 114 |
| 7th day | 80 | 112 |
| 8th day | 76 | 96 |
| 9th day | 72 | 79 |
| 10th day | 68 | 76 |
| 11th day | 66 | 64 |
| Appearance | Moldy | No mold |
| Odor | Musty | Fresh |

EXAMPLE VII

Treated and untreated baled hay having a moisture content of from 24% to 35% was maintained at a storage temperature of from 88° to 90° F. The treated hay contained one and one-half pounds of sodium sulfate having 2% by weight thereof of malt diastase per ton of hay. Internal temperature of the hay was measured periodically and the results were as follows:

Table 5

| Time of storage | Temperature, ° F., untreated | Temperature, ° F., treated |
| --- | --- | --- |
| 3rd day | 110–112 | 96–98 |
| 7th day | 128–134 | 86–88 |
| 14th day | 144–148 | 84–86 |
| 30th day | 90–92 | 84–86 |
| Appearance | Moldy | No Mold |
| Odor | Musty | Fresh |

As is evident from the foregoing disclosure, the preservative of the present invention is satisfactory for the preservation of silage having a high moisture content. Untreated silage, when stored in bags, bins, pails, silos or baled, will generate heat and undergo partial fermentation, which heat and undesirable fermentation will impair, to a great extent, the usable values of the silage. Included among the silage and other substances which may be treated in accordance with the invention are grapestem meal; walnut hull meal; green peavine; alfalfa leaf meal; wood flour; bark flour or chips; beet pulp; cotton gin trash; powdered milk for animal feed; spices; jute and sisal; cotton seed; and other finely divided or particulate combustible materials, either in the dry or semi-dry state.

It has also been found that good results are obtained when the silage is treated with magnesium sulfate or potassium sulfate, per se, or in admixture with from 1 part to 50 parts by weight thereof of malt diastase. While the amounts of preservative to silage shown in the present application are the preferred amounts, it will be understood by those skilled in the art that the amounts may vary between the various cereals and grasses in order to obtain the optimum results. Thus the sodium sulfate, magnesium sulfate and potassium sulfate is preferably used in an amount of from one-half to two pounds per ton of silage, with good results obtained with one and one-half pound of the sulfate per ton of silage. The presence of from 1 to 50 parts by weight of malt diastase, based on the weight of the sulfate, further improves the results obtained by this invention.

Having fully described our invention, what is claimed is:

1. The process for the preservation of silage comprising uniformly incorporating in said silage from one-half to two pounds of sodium sulfate per each ton of said silage.

2. The process for the preservation of grass silage comprising uniformly incorporating in said silage from one-half to two pounds of sodium sulfate per each ton of said grass silage.

3. The process for the preservation of corn silage comprising uniformly incorporating in said silage a mixture of sodium sulfate and malt diastase, said sodium sulfate being present in an amount of from one-half to two pounds per ton of said corn silage, said malt diastase being present in an amount of from 2% to 10% by weight of said sodium sulfate.

4. The process for the preservation of corn silage comprising uniformly incorporating in said silage a mixture of sodium sulfate and malt diastase, said sodium sulfate being present in an amount of one and one-half pounds per ton of said silage, said malt diastase being present in an amount of 2% by weight of said sodium sulfate.

5. The process for the preservation of silage, comprising uniformly incorporating therewith a mixture of sodium sulfate and malt diastase, said sodium sulfate being present in an amount of from one-half to two pounds per ton of said silage and cereals, said malt diastase being present in an amount of from 2% to 10% by weight of said sodium sulfate.

6. The process for the preservation of corn grist comprising uniformly incorporating with said corn grist a mixture of sodium sulfate and malt diastase, said sodium sulfate being present in an amount of from one-half to two pounds per ton of said corn grist, said malt diastase being present in an amount of from 2% to 10% by weight of said sodium sulfate.

7. The process for the preservation of baled hay comprising uniformly incorporating in said hay prior to baling a mixture of sodium sulfate and malt diastase, said sodium sulfate being present in an amount of from one-half to two pounds per ton of said hay, said malt diastase being present in an amount of from 2% to 10% by weight of said sodium sulfate.

8. The process for the preservation of silage, comprising uniformly incorporating therewith a preservative amount of a member selected from the group consisting of sodium sulfate, potassium sulfate and magnesium sulfate.

9. The process for the preservation of silage, comprising uniformly incorporating therewith a preservative amount of a mixture of malt diastase and a member selected from the group consisting of sodium sulfate, potassium sulfate and magnesium sulfate, said malt diastase being present in an amount of from 2% to 10% by weight of said sulfate.

10. The process as defined in claim 9 wherein said malt diastase is present in an amount of from 1 part by weight malt diastase to 50 parts by weight of said sulfate.

11. The process as defined in claim 9 wherein said mixture is present in an amount of from one-half to two pounds per ton of said silage.

12. A process for the preservation of stored grasses and grains to be subsequently used as feed for animals, comprising incorporating in said grasses and grains a preservative amount of a member selected from the group consisting of sodium sulfate, potassium sulfate, and magnesium sulfate.

13. A process for the preservation of stored grasses and grains to be subsequently used as feed for animals, comprising incorporating in said grains and grasses a preservative amount of a mixture of malt diastase and a member selected from the group consisting of sodium sulfate, potassium sulfate, and magnesium sulfate, said malt diastase being present in an amount of from 2% to 10% by weight of said sulfate.

References Cited by the Examiner

UNITED STATES PATENTS

| | | | |
|---|---|---|---|
| 1,807,067 | 5/31 | Mabee | 99—9 |
| 1,935,754 | 11/33 | Virtanen | 99—8 |
| 2,988,449 | 6/61 | Hollenbeck. | |

OTHER REFERENCES

Seiden: Feedstuffs, Springer Publishing Co., New York City, 1957, pp. 294–299.

A. LOUIS MONACELL, *Primary Examiner.*